J. L. CREVELING.
ELECTRIC REGULATION.
APPLICATION FILED OCT. 24, 1914.
1,217,858.
Patented Feb. 27, 1917.
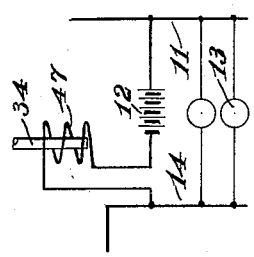
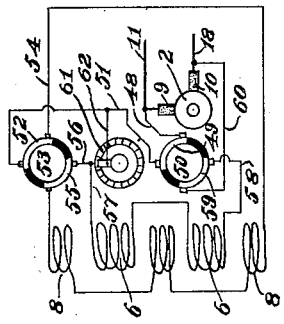
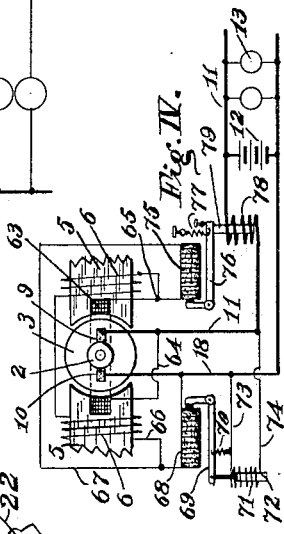
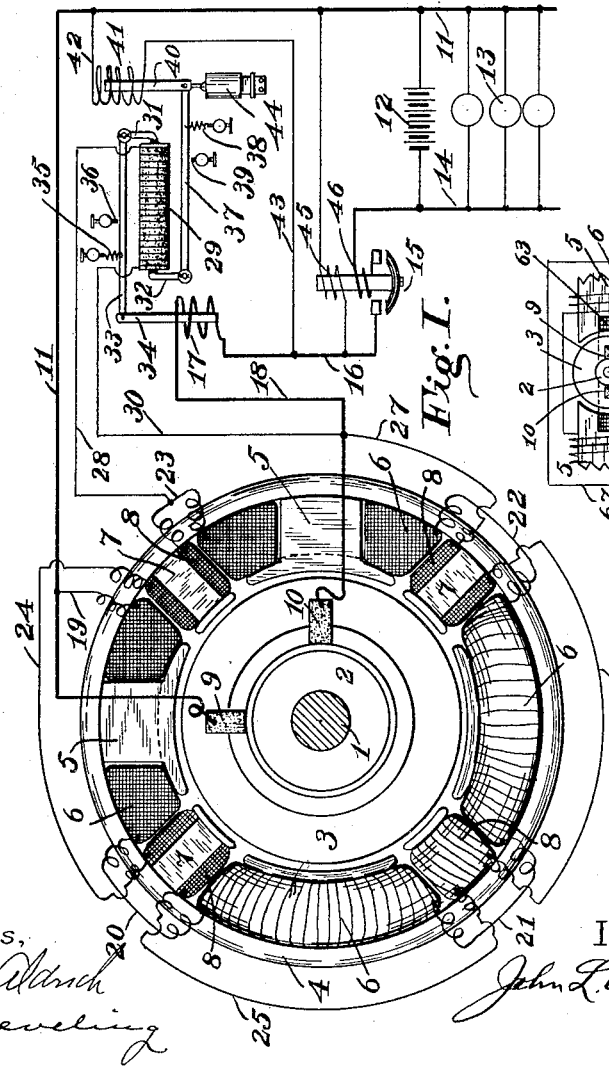
WITNESSES,
INVENTOR,

UNITED STATES PATENT OFFICE.

JOHN L. CREVELING, OF AUBURN, NEW YORK.

ELECTRIC REGULATION.

1,217,858.     Specification of Letters Patent.     Patented Feb. 27, 1917.

Application filed October 24, 1914. Serial No. 868,402.

*To all whom it may concern:*

Be it known that I, JOHN L. CREVELING, a citizen of the United States, residing at Auburn, in the county of Cayuga and State of New York, have invented new and useful Improvements in Electric Regulation, set forth in the annexed specification and drawing, forming a part thereof.

My invention pertains to that class of electric regulation wherein it is desired to regulate a dynamo electric machine, and may be used to regulate such a machine when serving either as a generator or as a motor.

My invention has for one of its particular objects, to provide means whereby such a dynamo electric machine may be automatically governed in a pre-determined manner, and will therefore be described more particularly with reference to such systems.

In the drawing, Figure I. diagrammatically represents one type of electric system comprehending my invention.

Fig. II. represents a modification of a portion of that system indicated in general in Fig. I.

Fig. III. is a diagrammatic representation of a modified form of system of distribution comprehending my invention.

Fig. IV. is a diagrammatic representation of an electric system embodying my invention.

In Fig. I., 1 represents the shaft of a dynamo provided with a commutator 2 in operative relation to the armature 3.

4 represents a field frame carrying the field magnet cores and pole pieces 5, surrounded by the exciting windings 6, which provide the main field for the armature 3. Between the pole pieces 5 are placed commutating cores and pole pieces 7, provided with exciting windings 8, and serving to assist in commutation, as will hereinafter more plainly appear.

9 and 10 represent the positive and negative brushes, respectively, coöperating with commutator 2. From the positive brush 9, the lead 11 is carried to the positive terminal of the storage battery 12 and lamps or other translating devices indicated at 13. The negative terminals of the battery 12 and translating devices 13 are connected to the lead 14, which is connected through the winding 46 with one terminal of the automatic switch 15, the opposite terminal of which is connected as by the lead 16 with one terminal of the coil 17, having its opposite terminal connected with the brush 10, as by the lead 18.

One of the field coils 6 is connected as by the wire 19 with the positive lead 11. The remaining terminal of the said coil is connected as by the wire 20 with one terminal of the next field coil 6. The second terminal of this coil is connected as by wire 21 with one end of the next field coil 6. The remaining end of this coil is connected as by wire 22 with one end of the remaining field coil 6, the opposite end of which is connected as by wire 23 with one end of a commutating pole winding 8, as indicated. The opposite end of this coil 8 is connected as by wire 24 with one end of the next coil 8, which has its remaining end connected as by wire 25 with the next coil 8, which has its remaining terminal connected as by wire 26 with one end of the remaining coil 8, which has its other terminal connected as by wire 27 with the negative lead 18.

Therefore, it will be noted that the exciting windings 6 are in series with each other and are connected in series with the coils 8, across the terminals of the dynamo. The coils 6 are so wound as to properly excite the generator, while the coils 8 are so wound as to properly excite the so-called inter-poles to assist in commutation, as will hereinafter be described.

From wire 23, the wire 28 is led to one end of a suitable variable regulating resistance, in this instance shown as a carbon pile, indicated at 29. The remaining terminal of the said pile is connected as by the wire 30 with the lead 18. Therefore, the said pile 29 is in shunt to the commutating windings 8, and the current flowing through the said windings and the current flowing through the main winding 6 may be controlled by variations in the resistance 29, as will hereinafter appear.

The carbon pile 29 is shown as compressed between the two levers 31 and 32, the lever 31 being united to the longer lever 33, carrying the core of magnetic material 34 within the solenoid 17, and normally drawn in an upward direction as by the adjustable spring 35, tending to bring the lever 33 in contact with the adjustable screw 36. The lever 32 is connected with the longer lever 37, normally drawn in a downward direction as by the spring 38, tending to bring the lever 37 in contact with the adjustable screw 39. The lever 37 is provided at its free extremity with the core of magnetic material 40, surrounded by the voltage coil 41, which is in shunt across the leads 11 and 16 as by wires 42 and 43.

44 represents a dashpot, which may be connected with the lever 37, as shown, to prevent any too sudden movement being imparted to the same. It will be obvious that any suitable type of dashpot may be used to perform this function, and that one may be connected to coöperate with the lever 33, if desired.

45 is a fine winding in shunt across the leads 11 and 16, and which operates to close the switch 15 under proper conditions.

In Fig. II. like figures are used to indicate like parts of the system indicated in Fig. I. The only difference intended to be brought out by Fig. II. is that the coil 17 in the main circuit in Fig. I. is suppressed, and the coil 47 in series with a portion of the load, in this instance the storage battery 12, used to operate the core 34 in its stead.

In Fig. III. like numerals are used to indicate diagrammatically represented like parts which are shown more fully portrayed in Fig. I.

In the said Fig. III the wire 48 connects the positive lead 11 with the conducting segment 49 of the pole changer indicated at 50, the said conducting segment of which is shown as connected by the wire 51 with the segment 52 of the pole changer 53, said segment 52 being connected as by the wire 54 with one end of the commutating windings 8, the opposite end of which is connected with the segment 55 of the pole changer 53. The wire 56 is electrically connected with the segment 55 of the pole changer 53, and also with one end of the field winding 6, as by wire 57, the opposite end of the said winding 6 being connected as by wire 58 with the segment 59 of the pole changer 50, the said segment 59 being connected as by wire 60 with the negative lead 18. The variable regulating resistance, in this instance indicated as a manually operated rheostat 61, has one terminal connected with wire 56, as shown, and its opposite terminal connected with the wire 51 as by wire 62.

The pole changers 50 and 53 may be of any of the well known types, either operated automatically or manually, as may be desired for the functions to be fulfilled, and are merely diagrammatically portrayed in the figure for the sake of simplicity, it being obvious that rotation of the segments through 90° in either direction will cause the connections to the pole changers to be reversed. For example, in the pole changer 50, as shown in the drawing, wires 48 and 51 are in electrical communication with each other through the segment 49, while the wires 58 and 60 are in electrical communication with each other through the segment 59. Rotation of the segments through 90° in either direction will serve to electrically connect the wire 48 with the wire 58, and the wire 60 with the wire 51, thus reversing the connections of coils 6 with reference to the brushes 9 and 10.

Likewise, the pole changer 53 may be used to reverse the polarity of the coils 8, if desired.

In Fig. IV there is shown a modification in which the commutating poles 7 are eliminated, and a commutating winding 63 substituted instead. It will, of course, be obvious that such windings may be substituted bodily for the commutating poles and their windings in Fig. I. However, a different method of connection is shown in Fig. IV, in order to show a modified form of system comprehending my invention. One end of the commutating winding 63 is connected with the positive lead 11 as by the wire 64. The remaining end of the winding 63 is connected with one end of the exciting winding 6 as shown at the junction point 65, the opposite terminal of the exciting winding being connected as by the wire 66 with the wire 67, communicating with one terminal of the carbon pile 68, the opposite terminal of which is connected with the negative lead 18.

The carbon pile 68 is normally compressed by the bell crank lever 69, drawn in a downward direction as by the spring 70. The lever 69 carries the core of magnetic material 72 surrounded by the solenoid 71 across the terminals 11 and 18 as by the wires 74 and 73, and tending, when excited, to lift the core 72 and increase the resistance 68, as will hereinafter be more fully explained.

The wire 67 is also connected with one end of the carbon pile 75, the opposite terminal of which is connected with the coils 6 and coil 63 at the junction point 65. The pile 75 is controlled by the bell crank lever 76, normally drawn in an upward direction by the spring 77, tending to increase the resistance 75 to a maximum. Lever 76 is provided at its extremity with the core 79, surrounded by the coil 78 in series with the lead 11, and tending, when excited by current supplied by the generator, to pull the core 79 downwardly against the action of spring 77 and decrease the resistance 75.

As my invention is particularly useful in systems of electric distribution wherein a dynamo driven at widely varying speeds is used to charge a storage battery and operate lamps or other translating devices, and is automatically governed to perform these functions, it will be described more particularly with reference to such systems, and the operation of the above embodiments of my invention is substantially as follows:

Considering Fig. I, with the generator at rest, the lamps or translating devices 13 may be operated by the storage battery 12, while the other parts of the system are practically inoperative. If now, the generator have its armature 3 revolved at any appreciable speed, it will set up an electro-motive-force, causing some current to flow from brush 9 through lead 11 and wire 19, to the exciting coils 6, which are connected together by wires 20, 21 and 22 and to the wire 23, from which wire return is made to the negative lead 18 both by way of the coils 8, exciting the commutating poles and connected together by wires 24, 25 and 26, and connected to the negative lead 18 by wire 27; and by way of the path provided by wire 28, variable resistance or carbon pile 29, and wire 30 to the lead 18.

And, it will be obvious that, if the resistance 29 be nil, the current in coils 8 will also be nil, and the main exciting coils 6 will then be, in effect, directly in shunt across the leads. In practice, I choose to use a form of rheostat 29, which, if in the form of a carbon pile, will have quite low resistance when compressed, and very high resistance when working at its least compression; in fact, it being practical to open the circuit through the carbon pile entirely at this limit, if desired. I so design the field coils 6, which I have shown connected in series with each other, but which obviously may be connected in multiple with each other, or in any other inter-relation that may be found desirable without in any way departing from my invention, that they, operating alone, will provide a strong field and cause the generator to reach its operating voltage at as low a speed as practicable. And, I so proportion the coils 8 that, if the generator be running at the maximum speed to which it is to be subjected, and the resistance 29 increased to the operating maximum, the resistance of the coils 8 which will then, in effect, be substantially in series with the coils 6, will so cut down the current in the field coils 6 that the voltage desired at this speed will not be exceeded.

Therefore, it will be obvious that, at this highest speed, the field set up by the coils 6 may be at its weakest limit during operation; and, therefore, the tendency of the cross ampere turns of the armature to cause distortion of the field will be greatest, tending to interfere most with the proper commutation, to cause sparking at the brushes, and other detrimental effects. However, it will be obvious that increasing the resistance 29 will increase the current in the coils 8, exciting the commutating poles which are arranged to oppose this distortion and which will have their maximum excitation at the time the main exciting poles are weakest, and thus the commutating poles will increase in their tendency to offset the field distortion as they are strengthened and the field coils 6 have their current weakened; it only being necessary that the proper polarity be chosen for the commutating poles to assist in commutation in a now well known manner, analogous to the assistance rendered by the series wound "interpoles" now in general use.

In the system shown in Fig I., when the voltage across the leads is substantially equal to the normal voltage of the battery 12, the switch 15 may be so adjusted as to be closed by the coil 45, and to connect the translation circuit with the generator in a well known manner, and current will then flow from the lead 11 through the battery 12 and translating devices 13, lead 14, coil 46, switch 15, lead 16, coil 17, and lead 18 to the generator.

It will therefore be noted that the main generator current will pass through the coil 17 and tend to draw the core 34 downwardly against the action of the adjustable spring 35, and thus swing the bell crank lever 33—31 in such manner as to increase the resistance 29. And, I so adjust the spring 35 that when the maximum current output desired is reached, an increase above this maximum will cause the resistance 29 to be increased, and thus cut down the field excitation caused by the coils 6. This will simultaneously increase the effect of the coils 8 which assist in proper commutation, which assistance at this particular time is most desirable, owing to the maximum load on the armature, and thus the maximum cross ampere turns in a weakened field.

Thus it will be noted, that as the main field is cut down the commutating field is increased to cut down the tendency of field distortion and sparking at the commutator. Therefore, it will also be noted, that the drop across the resistance 29 will not be merely dissipated in useless heat, as is usual, but a larger portion of the energy usually dissipated in the resistance 29 will be diverted through the coils 8 which perform the useful function of assisting in commutation.

If, while operating, for example, as above set forth, the battery becomes sufficiently charged that its voltage rise appreciably, such rise will cause an increase of current in the voltage coil 41 across the leads. And I so adjust the spring 38 that when the maximum voltage desired to have upon the circuit is reached, the coil 41 will cause the core 40 to be raised in such manner as to swing the bell crank lever 32—37 and increase the resistance 29 in such manner as to cause this desired voltage not to be exceeded.

It will therefore be obvious, that with the arrangement shown in Fig I. the total current delivered by the generator, and the voltage impressed across its circuit, may both be automatically held within pre-determined limits. Therefore, when a portion of the generator's load is in the form of a storage battery, a certain pre-determined current will not be exceeded therethrough, even if its voltage be low. Further, as a pre-determined voltage limit will not be exceeded by the generator, the charging current of the battery will automatically be cut down as its voltage approaches this limit, and at all times the generator will be protected against overload.

If the generator speed be cut down, a reverse of the above outlined operations will take place in a well known manner, and when the voltage of the generator falls until slightly below that of storage battery 12, a slight back discharge through the coil 46 will cause the switch 15 to open in a well known manner, and the generator and remainder of the system will be under substantially the same conditions as at the beginning of the operation above described.

In that modification of this system intended to be portrayed in Fig II. the operation will be identical with that above outlined with reference to the system of Fig. I., with the exception that the generator will be regulated in such a manner that a portion of the load, in this instance the charging current to the battery through the coil 47, will not exceed a certain limit, instead of the total generator current being so limited, as set forth in Fig. I.

In that modification shown in Fig. III., the dynamo provided with the commutator 2 may be either a motor or a generator, and manipulation of the hand-operated rheostat 61, so as to increase the resistance thereof, will cut down the current in the main exciting coils diagrammatically portrayed at 6 and simultaneously increase the current in the commutating coils diagrammatically portrayed at 8, in the same manner that increase of resistance 29 affected the coils 6 and 8 in Fig. I.

And, it will be noted, that manipulation of the pole changer 50 will cause the current through the coils 6 to be reversed, or maintained in the desired polarity; and that manipulation of the pole changer 53 will cause the current through the commutating windings 8 to be reversed, or maintained in the desired polarity. Therefore, it will be obvious that if this modification be employed, and the dynamo used either as a generator or a motor, the field coils may have the direction of current therein of such polarity as to properly excite the machine, and the commutating coils 8 of such polarity as to properly assist in commutation as the main field is cut down, either to compensate for the changes in speed, in the case of a generator, for example, or to cause changes in speed, as in the case of a motor, for example.

And, it will be obvious, that the pole changers 50 and 53 may be automatically governed in any desired manner, as well as may be the resistance 61, this figure being intended to merely denote the presence of the said instrumentalities, without regard to particular details thereof.

In the application of my invention portrayed in Fig. IV., and with the generator running at operative speed, an operation is substantially as follows:

Current will flow from the positive brush 9 through the lead 11, coil 78, and continuation of lead 11, to the battery 12 and translating devices 13, from which it will return to the generator through the lead 18. Current will also flow from the lead 11, through wire 64 and commutating winding 63, surrounding the armature in such manner as to oppose the effects of the cross ampere turns, and thence to the junction 65, where it will divide, under conditions to be described, and part return through the field winding 6 and wire 66 and carbon pile 68, to the lead 18; and part return through carbon pile 75, wire 67, and carbon pile 68, to the lead 18.

From this it will be seen that the carbon pile 75 is in shunt around the main field winding 6, through wire 67; and that the coil 63 is in series with the field winding 6 and its shunt 75; also, that the commutating winding 63, in series with the main winding 6 and its shunt 75, are in series with the carbon pile 68, across the leads 11 and 18.

I so adjust the spring 77 that when the current through the coil 78 is less than the desired maximum to be delivered by the generator, the bell crank lever 76 will be so operated by the spring 77 that the resistance 75 is very high, and, if increased to infinity, the commutating coil 63 and the main coils 6 will simply be in series with each other and across the leads, through the variable resistance 68.

And, I so arrange the spring 70 that if the voltage across the leads tend to increase above a desired maximum, the coil 71 will lift its core 72 and move the lever 69 against the action of the spring 70 in such manner as to insert resistance 68 and cut down the current in both the field and commutating windings in such manner as to prevent this maximum voltage being exceeded.

Therefore, when this system is used in connection with the storage battery, as indicated at 12, and the voltage of the battery rises and approaches the maximum voltage, excess of which is prevented by the voltage coil 71 affecting the resistance 68, the charging current will fall off, and the work upon the generator will be lessened, and both the field windings 6 and the commutating winding 63 will have the current therethrough simultaneously reduced, for, the main output being under these conditions cut down, the armature reaction is less, and the necessary compensating action of the coil 63 may be less.

However, I so adjust the spring 77 that when the maximum current output which it is desired to have upon the generator is reached, the coil 78 will cause the lever 76 to be operated to decrease the resistance 75, and thus weaken the main field 6, by shunting current around the same, and strengthen the commutating ampere turns by increasing the current in the coil 63 by lowering the combined resistance of the coil 6 and the resistance 75.

Therefore, it will be noted, that as the field is cut down to prevent a heavy current from being exceeded, at which time the cross ampere turns and consequent tendency toward field distortion and sparking are the greatest, the strength of the compensating coil 63 will be greatly increased to offset the tendency of the bad effects of the cross turns on the armature.

It is, of course, obvious that the coil 63 must necessarily have sufficient resistance that shunting of the main coils 6 may increase the current in coil 63 without overheating the same.

It will further be obvious, that coils as indicated in Fig. IV., may be employed in place of the inter-poles as indicated in Fig. I., and vice versa. Also, that the coil 78 in Fig. IV., may be in series with the battery 12, instead of in series with the main load, as is shown in that modification of the system of Fig. I., indicated in Fig. II.

It will also be obvious that the coil 71 may be arranged to cause its lever 69 to affect the carbon pile 75 to weaken the field as the voltage tends to increase above a predetermined limit analogous to the manner in which the two levers affect the pile 29 in Fig. I. and that in this case the pile 68 would then be suppressed. The converse of this is true with respect to Fig. I.

It is further obvious that any kind of pole changing apparatus may be employed for changing the mutual relations of the exciting coils and the commutating coils, as may be desired, one example merely being shown in Fig. III.

It is further obvious that many changes may be made in the way of details of construction and arrangements of parts and instrumentalities, and other equivalent devices may be used in place of the ones portrayed in the drawing.

Therefore, I do not wish in any way to limit myself to any of the particular details used to portray my invention, which is as set forth in the following claims:

1. In a dynamo, an armature winding, a shunt field exciting winding, and a commutating winding in series with said field winding.

2. A dynamo, an armature winding, a shunt field exciting winding, a commutating winding in series with said field winding, and means for controlling the current in said windings.

3. The combination with a dynamo comprehending an armature, a shunt field exciting winding, and a commutating winding in series with said field winding, of means for varying the current in said commutating winding.

4. The combination with a dynamo comprehending an armature, a shunt field exciting winding, and a commutating winding in series with said field winding, of means for varying the current in said field winding.

5. The combination with a dynamo comprehending an armature, a shunt field exciting winding, and a commutating winding in series with said field winding, of means for varying the current in said field and commutating windings.

6. The combination with a dynamo comprehending an armature, a shunt field exciting winding, and a commutating winding in series with said field winding, of means for varying the current in said commutating winding responsive to current fluctuations.

7. The combination with a dynamo comprehending an armature, a shunt field exciting winding, and a commutating winding in series with said field winding, of means for varying the current in said field winding responsive to current fluctuations.

8. The combination with a dynamo comprehending an armature, a shunt field exciting winding, and a commutating winding in series with said field winding, of means for varying the current in said field and commutating windings responsive to current fluctuations.

9. The combination with a dynamo comprehending an armature, a field exciting winding, and a commutating winding in series with said field winding, of means for varying the current in said commutating winding responsive to voltage fluctuations.

10. The combination with a dynamo comprehending an armature, a shunt field exciting winding, and a commutating winding in series with said field winding, of means for varying the current in said field winding responsive to voltage fluctuations.

11. The combination with a dynamo comprehending an armature, a field exciting winding, and a communicating winding in series with said field winding, of means for varying the current in said field and communicating windings responsive to voltage fluctuations.

12. The combination with a dynamo comprehending an armature, a field exciting winding, and a commutating winding in series with said field winding, of means for varying the current in said commutating winding responsive to voltage and current fluctuations.

13. The combination with a dynamo comprehending an armature, a shunt field exciting winding, and a commutating winding in series with said field winding, of means for varying the current in said field winding responsive to voltage and current fluctuations.

14. The combination with a dynamo comprehending an armature, a field exciting winding, and a commutating winding in series with said field winding, of means for varying the current in said field and commutating windings responsive to voltage and current fluctuations.

15. In an electric system comprehending a movable inductor, means for setting up a magnetic field for said inductor combined with means for modifying the effect of current in said inductor upon said field, and common means for oppositely affecting said field and said modifying means.

16. In an electric system comprehending a movable inductor, means for setting up a magnetic field for said inductor combined with means for modifying the effect of current in said inductor upon said field, and automatic means for oppositely affecting said field and said modifying means.

17. In an electric system comprehending a movable inductor, means for setting up a magnetic field for said inductor combined with means for modifying the effect of current in said inductor upon said field, and means for regulating said field and said modifying means responsive to voltage fluctuations.

18. In an electric system comprehending a movable inductor, means for setting up a magnetic field for said inductor combined with means for modifying the effect of current in said inductor upon said field, and means for oppositely varying the strength of said field and said modifying means responsive to current fluctuations.

19. In an electric system comprehending a movable inductor, means for setting up a magnetic field for said inductor combined with means for modifying the effect of current in said inductor upon said field, and means for regulating said field and said modifying means responsive to current and voltage fluctuations.

20. In an electric system, an armature, means for maintaining a magnetic field therefor, means for opposing the effect of current through said armature upon said field, and means for regulating the operation of said armature comprehending means for simultaneously and oppositely affecting both the maintaining and opposing means.

21. In an electric system, an armature, means for maintaining a magnetic field therefor, means for opposing the effect of current through said armature upon said field, and means for regulating the operation of said armature comprehending means for controlling in different degree both the maintaining and opposing means responsive to current fluctuations.

22. In an electric system, an armature driven at varying speeds, means for maintaining a magnetic field therefor, means for opposing the effect of current through said armature upon said field, and means for regulating the operation of said armature comprehending means for oppositely affecting the maintaining and opposing means responsive to voltage fluctuations.

23. In an electric system, an armature driven at varying speeds, means for maintaining a magnetic field therefor, means for opposing the effect of current through said armature upon said field, and means for regulating the operation of said armature comprehending means for oppositely affecting both the maintaining and opposing means responsive to voltage and current fluctuations.

24. In an electric system, means for maintaining an electro-motive-force comprehending an armature, means for providing a magnetic field for said armature, means for modifying the effect upon said field of current in said armature, and means for regulating the electrical operation of said armature comprehending means for affecting the field maintaining means and the field affecting means in response to current fluctuations, and in response to voltage fluctuations, by different effects caused by said responsive means.

JOHN L. CREVELING.

Witnesses:
 J. P. CREVELING,
 MARY MONTAGUE.

Copies of this patent may be obtained for five cents each, by addressing the "Commissioner of Patents, Washington, D. C."

Correction in Letters Patent No. 1,217,858.

It is hereby certified that in Letters Patent No. 1,217,858, granted February 27, 1917, upon the application of John L. Creveling, of Auburn, New York, for an improvement in "Electric Regulation," an error appears in the printed specification requiring correction as follows: Page 5, line 129, claim 11, and page 6, lines 1-2, same claim, for the word 'communicating" read *commutating;* and that the said Letters Patent should be read with this correction therein that the same may conform to the record of the case in the Patent Office.

Signed and sealed this 20th day of March, A. D., 1917.

[SEAL.]

F. W. H. CLAY,

*Acting Commissioner of Patents.*

Cl. 171—223.